(12) United States Patent
Douglas

(10) Patent No.: US 9,635,868 B1
(45) Date of Patent: May 2, 2017

(54) SHELLFISH BEHEADING ASSEMBLY

(71) Applicant: Scott Douglas, South Fork, PA (US)

(72) Inventor: Scott Douglas, South Fork, PA (US)

(*) Notice: Subject to any disclaimer, the term of this patent is extended or adjusted under 35 U.S.C. 154(b) by 0 days.

(21) Appl. No.: 15/040,720

(22) Filed: Feb. 10, 2016

(51) Int. Cl.
*A22C 29/02* (2006.01)

(52) U.S. Cl.
CPC .................. *A22C 29/028* (2013.01)

(58) Field of Classification Search
CPC .... A22C 29/028; A22C 29/026; A22C 29/021
USPC ....... 452/1–6, 8, 9, 102–105, 125, 128, 132; 30/120.1–120.5, 114, 115, 124, 134; 81/3.4, 3.41, 3.44, 3.55, 3.47, 3.57, 9.4, 81/9.41, 9.42, 315, 316, 318, 319–321, 81/489, 491
See application file for complete search history.

(56) References Cited

U.S. PATENT DOCUMENTS

| | | | | |
|---|---|---|---|---|
| 2,441,743 A | * | 5/1948 | Albert | B67B 7/18 81/3.44 |
| 2,517,899 A | * | 8/1950 | Logan | A22C 29/024 452/6 |
| 2,700,910 A | * | 2/1955 | Van Niel | B25B 7/04 29/253 |
| 3,126,576 A | * | 3/1964 | Johannesen | A22C 29/024 452/3 |
| 3,152,627 A | * | 10/1964 | Pol Janic, Jr. | A47J 43/14 30/120.1 |
| 3,414,935 A | * | 12/1968 | Senna | A22C 25/006 452/103 |
| 3,932,914 A | * | 1/1976 | Lapeyre | A22C 29/02 452/2 |
| 4,005,504 A | * | 2/1977 | Lapeyre | A22C 29/026 426/479 |
| 4,316,306 A | * | 2/1982 | Huebotter | A22C 29/024 452/1 |
| 4,524,490 A | | 6/1985 | Newville | |
| 4,768,693 A | * | 9/1988 | Tomaszewski | A47J 43/26 225/94 |
| 5,009,006 A | * | 4/1991 | Sawyer | H02G 1/1229 30/90.6 |
| 5,361,688 A | * | 11/1994 | Blankenship | A47J 43/26 30/120.4 |
| 5,634,272 A | * | 6/1997 | Samuelson | A47J 43/26 30/120.2 |
| 7,169,032 B1 | | 1/2007 | Poland | |
| D537,685 S | | 3/2007 | Holcomb et al. | |
| 7,909,682 B1 | | 3/2011 | Goodman | |
| 2003/0124964 A1 | | 7/2003 | Congialosi | |

* cited by examiner

*Primary Examiner* — Richard Price, Jr.

(57) ABSTRACT

A shellfish beheading assembly includes a clipper that includes a top jaw and a bottom jaw. The top jaw is hingedly coupled to the bottom jaw. The clipper may have a shellfish positioned between the top jaw and the bottom jaw. The top jaw is selectively urged toward the bottom jaw. A saddle is coupled to the clipper and saddle is configured to have the shellfish positioned therein. A pair of blades is provided. A selected one of the blades is removably coupled to the clipper. Thus, the selected blade beheads the shellfish when the top jaw is urged toward the bottom jaw.

13 Claims, 5 Drawing Sheets

SHELLFISH BEHEADING ASSEMBLY

BACKGROUND OF THE DISCLOSURE

Field of the Disclosure

The disclosure relates to beheading devices and more particularly pertains to a new beheading device for beheading a shellfish.

SUMMARY OF THE DISCLOSURE

An embodiment of the disclosure meets the needs presented above by generally comprising a clipper that includes a top jaw and a bottom jaw. The top jaw is hingedly coupled to the bottom jaw. The clipper may have a shellfish positioned between the top jaw and the bottom jaw. The top jaw is selectively urged toward the bottom jaw. A saddle is coupled to the clipper and saddle is configured to have the shellfish positioned therein. A pair of blades is provided. A selected one of the blades is removably coupled to the clipper. Thus, the selected blade beheads the shellfish when the top jaw is urged toward the bottom jaw.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
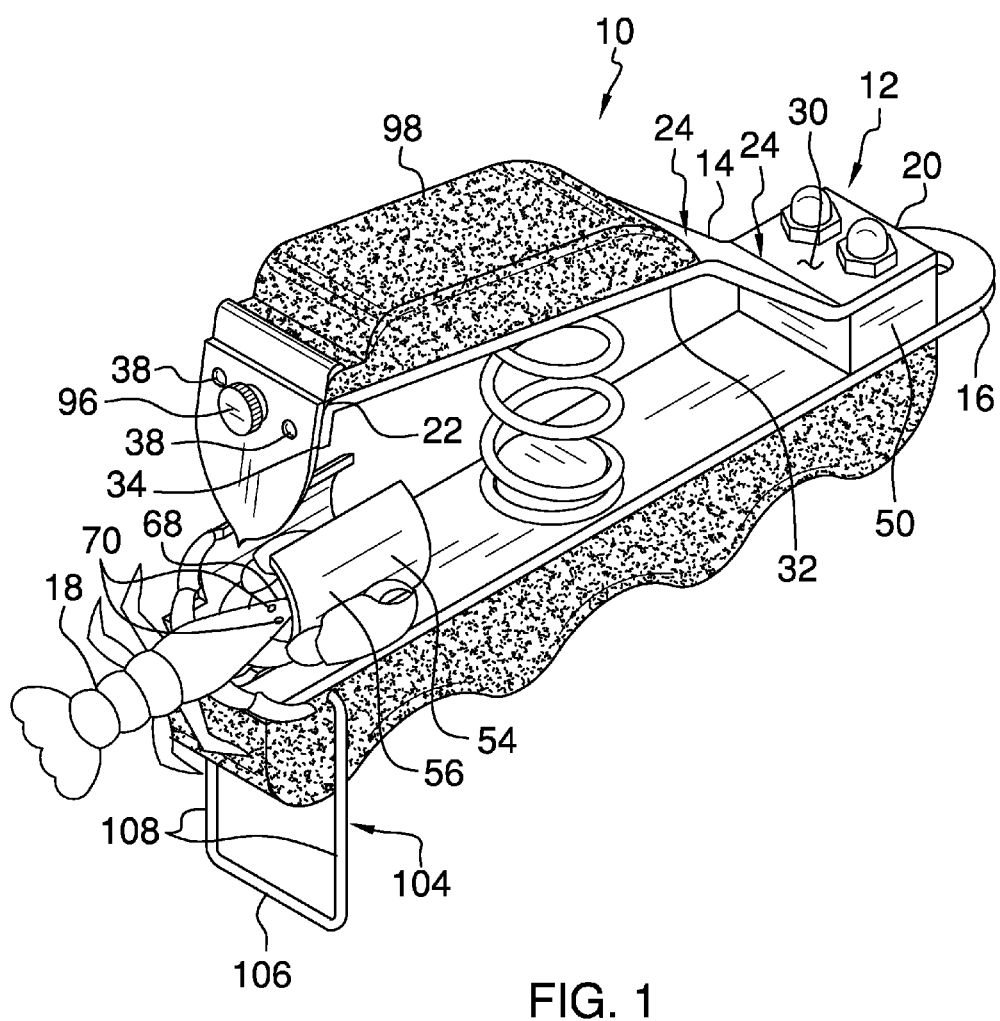
FIG. 1 is a perspective in-use view of a shellfish beheading assembly according to an embodiment of the disclosure.
Figure 2:
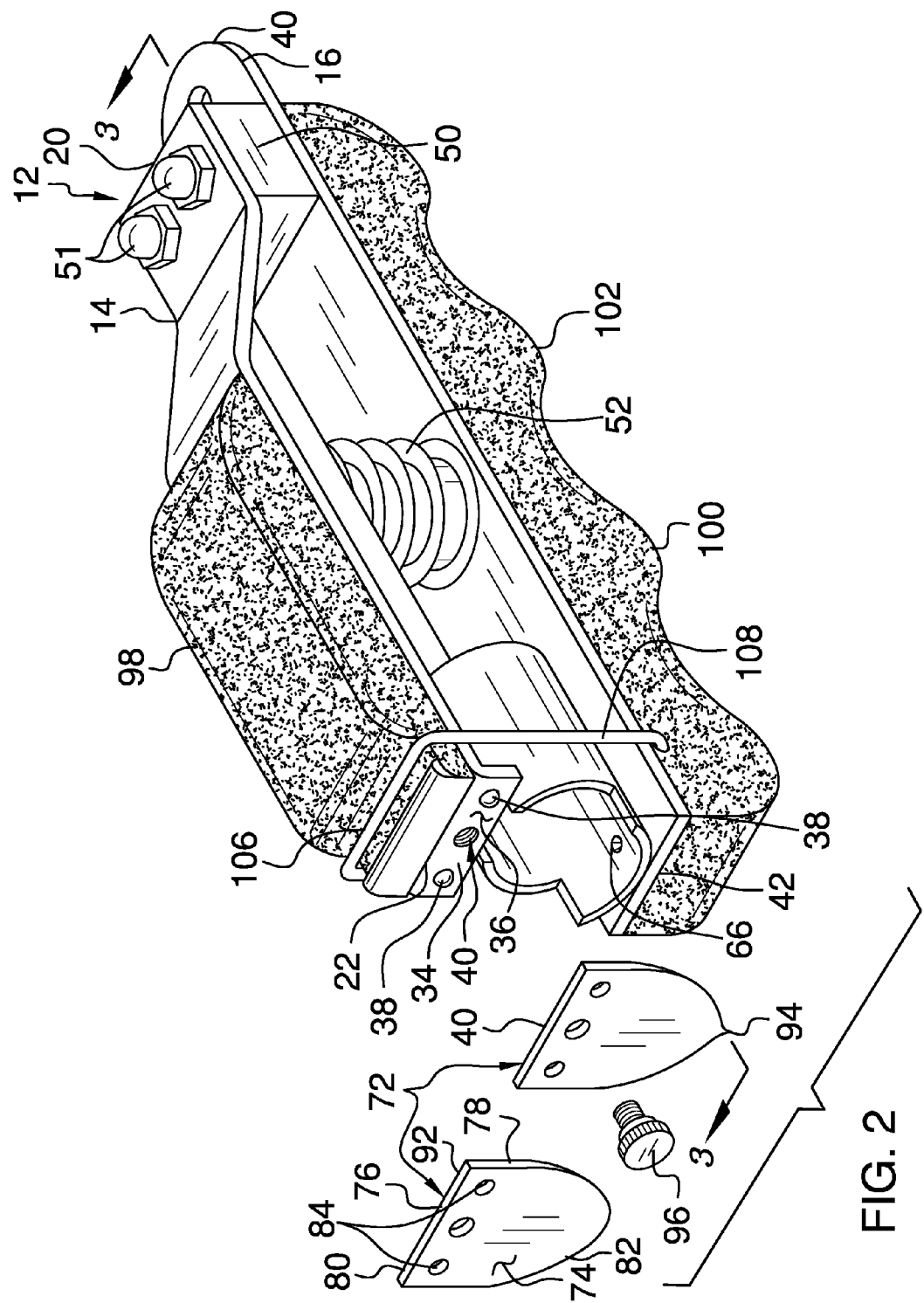
FIG. 2 is an exploded front perspective view of an embodiment of the disclosure.
Figure 3:
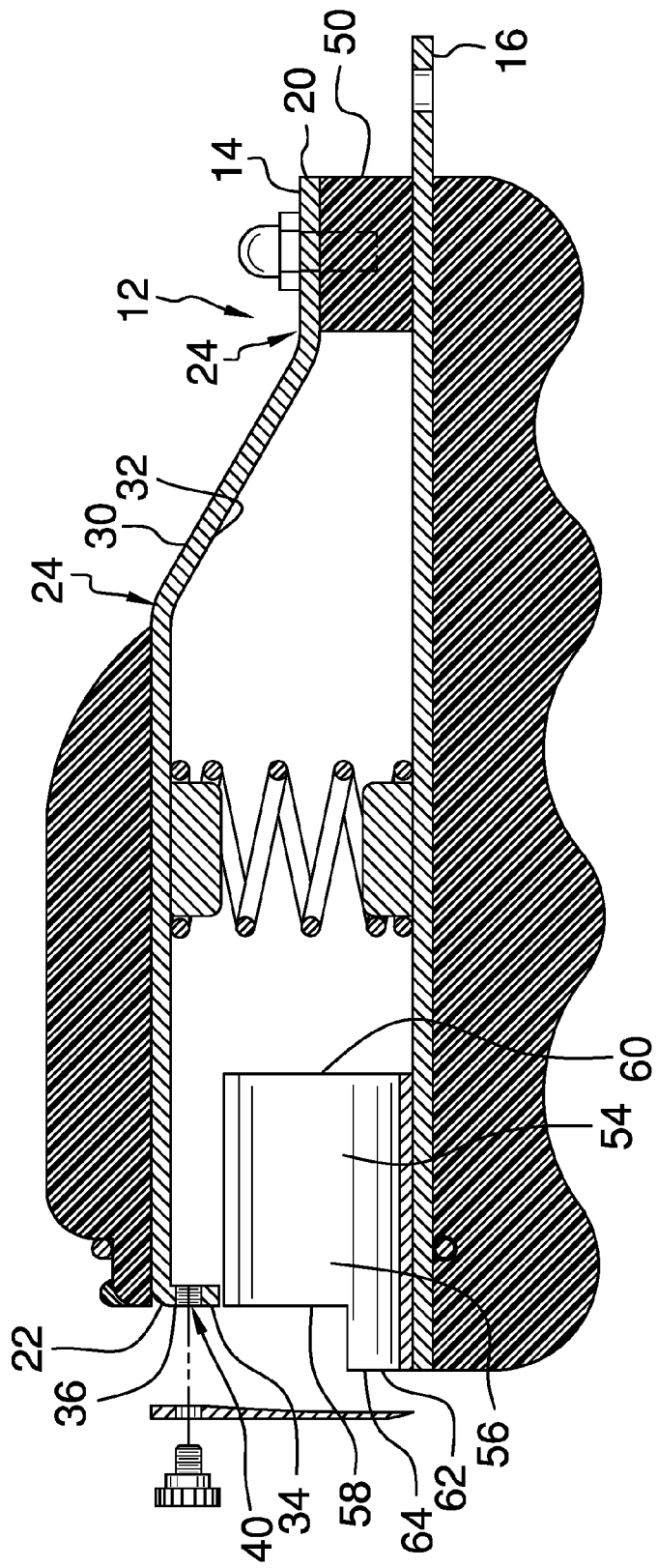
FIG. 3 is a cross sectional view taken along line 3-3 of FIG. 2 of an embodiment of the disclosure.
Figure 4:
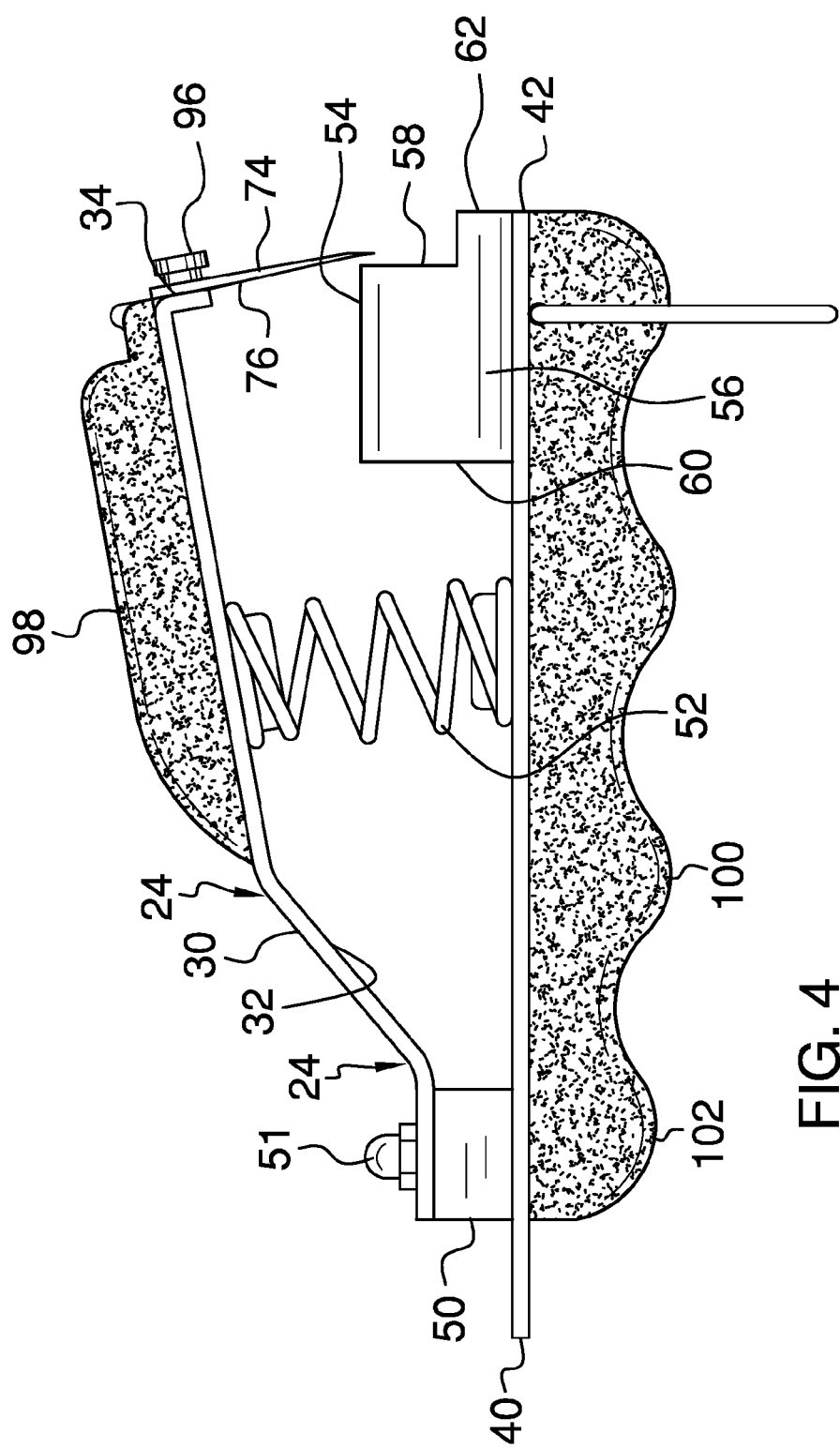
FIG. 4 is a back view of an embodiment of the disclosure.
Figure 5:
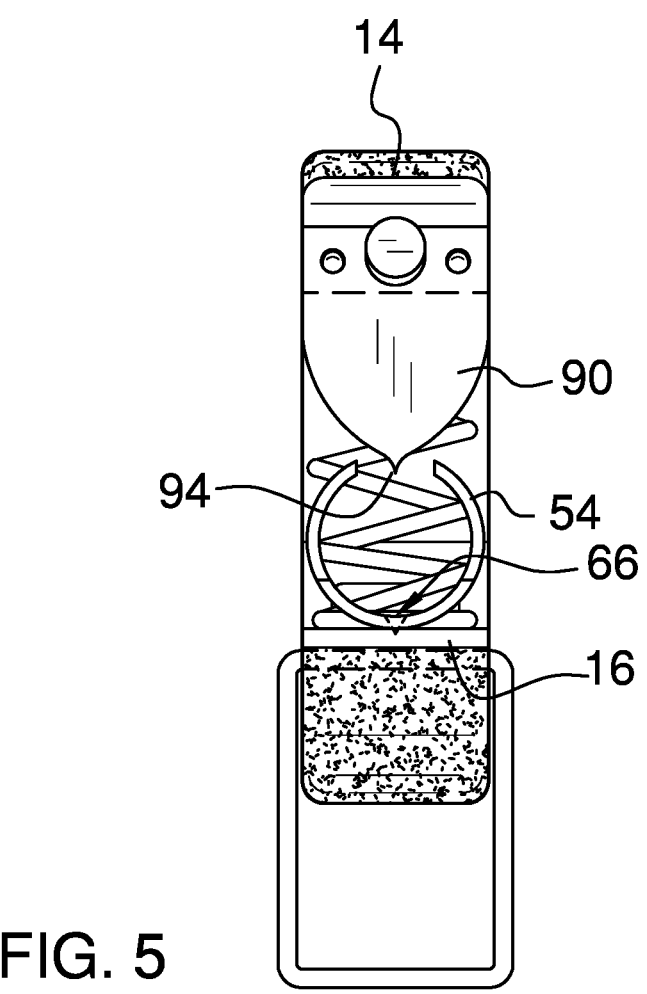
FIG. 5 is a front view of an embodiment of the disclosure.

With reference now to the drawings, and in particular to FIGS. 1 through 5 thereof, a new beheading device embodying the principles and concepts of an embodiment of the disclosure and generally designated by the reference numeral 10 will be described.

As best illustrated in FIGS. 1 through 5, the shellfish beheading assembly 10 generally comprises a clipper 12 that includes a top jaw 14 and a bottom jaw 16. The top jaw 14 is hingedly coupled to the bottom jaw 16. The clipper 12 may have a shellfish 18 positioned between the top jaw 14 and the bottom jaw 16. The top jaw 14 is selectively urged toward the bottom jaw 16. Thus, the shellfish 18 may be beheaded. The shellfish 18 may be a crawfish or the like.

The top jaw 14 has a first end 20 and a second end 22, and the top jaw 14 is elongated between the first end 20 and the second end 22. The top jaw 14 has a pair of bends 24 thereon. The bends 24 are spaced apart from each other to define a first portion 26 and a second portion 28 of the top jaw 14. Each of the bends 24 is positioned closer to the first end 20 than the second end 22 and each of the bends 24 defining an angle. The top jaw 14 has an upper surface 30 and a lower surface 32.

The angle corresponding to each of the bends 24 is congruent with each other such that the first portion 26 is offset with respect to the second portion 28. The top jaw 14 has a tab 34 extending downwardly therefrom and the tab 34 is aligned with the second end 22. The tab 34 has an outwardly facing surface 36 and the outwardly facing surface 36 has a pair of prominences 38. The prominences 38 are spaced apart from each other. The tab 34 has a fastener hole 40 extending therethrough and the fastener hole 40 is centrally positioned between the prominences 38.

The bottom jaw 16 has a primary end 42 and a secondary end 44. The bottom jaw 16 is elongated between the primary end 42 and the secondary end 44. The bottom jaw 16 has a top surface 46 and a bottom surface 48. The top jaw 14 is oriented such that the lower surface 32 faces the top surface 46 of the bottom jaw 16. Moreover, the top jaw 14 is coextensive with the bottom jaw 16.

A block 50 is coupled between the top jaw 14 and the bottom jaw 16 such that the top jaw 14 is spaced from the bottom jaw 16. The block 50 is positioned on the first portion 26 of the top jaw 14. The block 50 is positioned closer to the primary end 42 than the secondary end 44. A pair of bolts 51 extends through the top jaw 14, the block 50 and the bottom jaw 16. Thus, the block 50 is retained between the top jaw 14 and the bottom jaw 16.

A biasing member 52 extends between the top jaw 14 and the bottom jaw 16. The biasing member 52 is positioned on the second portion 28 of the top jaw 14. The biasing member 52 biases the second end 22 of the top jaw 14 away from the secondary end 44 of the bottom jaw 16. The clipper 12 is squeezed into a cutting position. The second end 22 is urged toward the secondary end 44 in the cutting position. The biasing member 52 may comprise a spring or the like.

A saddle 54 is coupled to the clipper 12 and the saddle 54 may have the shellfish 18 positioned therein. The saddle 54 has an outer wall 56 and the outer wall 56 is curved such that the saddle 54 is substantially cylindrically shaped. The outer wall 56 has a front end 58 and a back end 60. The saddle 54 is positioned on the top surface 46 of the bottom jaw 16. The saddle 54 is oriented to be coextensive with the bottom jaw 16. The front end 58 is aligned with the secondary end 44 of the bottom jaw 16.

The front end 58 of the saddle 54 has a lip 62 extending forwardly from the outer wall 56 and the lip 62 rests on the bottom jaw 16. The lip 62 has a distal end 64 with respect to the front end 58 and the distal end 64 is aligned with the secondary end 44 of the bottom jaw 16. The lip 62 has an aperture 66 extending through to the bottom jaw 16. The lip 62 may have a head 68 of the shell fish 18 positioned thereon such that eyes 70 of the shellfish 18 are aligned with the front end 58 of the saddle 54.

A pair of blades 72 is provided and a selected one of the blades 72 is removably coupled to the clipper 12. Thus, the selected blade 72 beheads the shellfish 18 when the top jaw 14 is urged toward the bottom jaw 16. Each of the blades 72 has a forward surface 74, a rearward surface 76 and a cutting edge 78 extending between the forward surface 74 and the rearward surface 76. The cutting edge 78 corresponding to each of the blades 72 has a first side 80 and a second side 82. The second side 82 is arcuate with respect to the first side 80. Thus, each of the blades 72 forms a parabolic segment.

Each of the blades 72 has a pair of mounting holes 84 extending through the forward surface 74 and the rearward surface 76. Each of the mounting holes 84 is positioned proximate the first side 80. Each of the prominences 38 extends through an associated one of the mounting holes 84 when the selected blade 72 is positioned on the tab 34. Thus, the selected blade 72 is inhibited from rocking on the tab 34.

The pair of blades 72 includes a first blade 90 and a second blade 92. The second side 82 corresponding to the first blade 90 tapers to a point 94 at a middle of the second side 82. The point 94 pierces a shell of a hard-shelled species of the shellfish 18 thereby facilitating the first blade 90 to cleanly cut the shell. Thus, a bladder of the hard-shelled species of the shellfish 18 from is inhibited from being torn when the shellfish 18 is beheaded. The point 94 on the first blade 90 extends into the aperture 66 in the saddle 54 when the top jaw 14 is urged toward the bottom jaw 16. The second side 82 corresponding to the second blade 92 may behead a soft-shelled species of the shellfish 18.

A screw 96 is provided and the screw 96 may be manipulated. The screw 96 extends through the selected blade 72 when the selected blade 72 is positioned on the tab 34. Moreover, the screw 96 engages the fastener hole 40. Thus, the selected blade 72 is retained on the tab 34.

A first cushion 98 is coupled to the top jaw 14 and the first cushion 98 may enhance gripping the top jaw 14. The first cushion 98 is positioned on the upper surface 30 corresponding to the second portion 28 of the top jaw 14. A second cushion 100 is coupled to the bottom jaw 16 and the second cushion 100 enhances gripping the bottom jaw 16. The second cushion 100 is positioned on the bottom surface 48 of the bottom jaw 16.

The second cushion 100 is substantially coextensive with the bottom jaw 16. The second cushion 100 has a lowermost surface 102. The lowermost surface 102 undulates between the primary end 42 and the secondary end 44 of the bottom jaw 16. Thus, the second cushion 100 may accommodate fingers when the second cushion 100 is gripped. Each of the first cushion 98 and the second cushion 100 may be comprised of a resiliently compressible material.

A latch 104 is provided that has a central member 106 extending between a pair of lateral members 108. Each of the lateral members 108 is hingedly coupled to opposite sides of the bottom jaw 16. The latch 104 is positioned adjacent to the secondary end 44. The latch 104 is positionable in a locking position having the central member 106 engaging the top jaw 14. Thus, the clipper 12 is retained in the clipping position.

In use, the first blade 90 is coupled to the clipper 12 to behead the hard shelled species of shellfish 18. The shellfish 18 is positioned in the saddle 54 and the eyes 70 of the shellfish 18 are aligned with the front end 58 of the saddle 54. The top jaw 14 is urged downwardly toward the bottom jaw 16 and the first blade 90 beheads the shellfish 18. The shellfish 18 is beheaded to comply with local game fish and parks laws or the like. The second blade 92 is coupled to the clipper 12 to behead the soft shelled species of shellfish 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A shellfish beheading assembly comprising:
   a clipper comprising a top jaw and a bottom jaw, said top jaw being hingedly coupled to said bottom jaw, said clipper being configured to have a shellfish positioned between said top jaw and said bottom jaw, said top jaw being selectively urged toward said bottom jaw;
   a saddle being coupled to said clipper wherein said saddle is configured to have the shellfish positioned therein; and
   a pair of blades, a selected one of said blades being removably coupled to said clipper wherein said selected blade is configured to behead the shellfish when said top jaw is urged toward said bottom jaw; and
   wherein said top jaw has a first end and a second end, said top jaw being elongated between said first end and said second end, said top jaw having a pair of bends thereon, said bends being spaced apart from each other to define a first portion and a second portion of said top jaw, each of said bends being positioned closer to said first end than said second end, each of said bends defining an angle, said angle corresponding to each of said bends being congruent such that said first portion is offset with respect to said second portion, said top jaw having an upper surface and a lower surface.

2. The assembly according to claim 1, wherein said top jaw has a tab extending downwardly therefrom, said tab being aligned with said second end, said tab having an outwardly facing surface, said outwardly facing surface having a pair of prominences, said prominences being spaced apart from each other, said tab having a fastener hole extending therethrough, said fastener hole being centrally positioned between said prominences.

3. The assembly according to claim 1, wherein said bottom jaw has a primary end and a secondary end, said bottom jaw being elongated between said primary end and said secondary end, said bottom jaw having a top surface and a bottom surface, said top jaw being oriented such that a lower surface of said top jaw faces said top surface of said bottom jaw having said top jaw being coextensive with said bottom jaw.

4. The assembly according to claim 1, further comprising:
   said bottom jaw having a primary end and a secondary end; and
   a block being coupled between said top jaw and said bottom jaw such that said top jaw is spaced from said bottom jaw, said block being positioned on said first portion of said top jaw, said block being positioned closer to a primary end than a secondary end of said bottom jaw.

5. The assembly according to claim 1, further comprising:
said bottom jaw having a secondary end; and
a biasing member extending between said top jaw and said bottom jaw, said biasing member being positioned on said second portion of said top jaw, said biasing member biasing said second end of said top jaw away from said secondary end of said bottom jaw, said clipper being positioned in a cutting position having said second end being urged toward said secondary end.

6. A shellfish beheading assembly comprising:
a clipper comprising a top jaw and a bottom jaw, said top jaw being hingedly coupled to said bottom jaw, said clipper being configured to have a shellfish positioned between said top jaw and said bottom jaw, said top jaw being selectively urged toward said bottom jaw;
a saddle being coupled to said clipper wherein said saddle is configured to have the shellfish positioned therein;
a pair of blades, a selected one of said blades being removably coupled to said clipper wherein said selected blade is configured to behead the shellfish when said top jaw is urged toward said bottom jaw;
wherein said bottom jaw has a primary end and a secondary end, said bottom jaw being elongated between said primary end and said secondary end, said bottom jaw having a top surface and a bottom surface, said top jaw being oriented such that a lower surface of said top jaw faces said top surface of said bottom jaw having said top jaw being coextensive with said bottom jaw;
said saddle has an outer wall, said outer wall being curved such that said saddle is substantially cylindrically shaped, said outer wall having a front end and a back end, said saddle being positioned on said upper surface of said bottom jaw, said saddle being oriented to be substantially coextensive with said bottom jaw; and
said outer wall has a lip extending forwardly from said outer wall, said lip abutting said bottom jaw, said lip having a distal end with respect to said front end, said distal end being aligned with said secondary end of said bottom jaw.

7. The assembly according to claim 1, wherein each of said blades has a forward surface, a rearward surface and a cutting edge extending between said forward surface and said rearward surface, said cutting edge corresponding to each of said blades having a first side and a second side, said second side being arcuate with respect to said first side such that each of said blades forms a parabolic segment.

8. The assembly according to claim 7, wherein said pair of blades includes a first blade and a second blade, said second side corresponding to said first blade tapering to a point at a middle of said second side wherein said first blade is configured to pierce a shell of a hard-shelled species of the shellfish thereby inhibiting a bladder of the hard-shelled species of the shellfish from being torn when the shellfish is beheaded, said point on said first blade extending into said aperture in said saddle when said top jaw is urged toward said bottom jaw, said second side corresponding to said second blade being configured to behead a soft-shelled species of the shellfish.

9. The assembly according to claim 1, further comprising a first cushion being coupled to said top jaw wherein said first cushion is configured to enhance gripping said top jaw, said first cushion being positioned on said upper surface corresponding to said second portion of said top jaw.

10. The assembly according to claim 9, further comprising a second cushion being coupled to said bottom jaw wherein said second cushion is configured to enhance gripping said bottom jaw, said second cushion being positioned on said bottom surface of said bottom jaw, said second cushion being substantially coextensive with said bottom jaw, said second cushion having a lowermost surface, said lowermost surface undulating between said primary end and said secondary end of said bottom jaw wherein said second cushion is configured to accommodate fingers when said second cushion is gripped.

11. The assembly of claim 1, further comprising:
said top jaw having a tab extending downwardly therefrom, said tab being aligned with said second end, said tab having an outwardly facing surface, said outwardly facing surface having a pair of prominences, said prominences being spaced apart from each other, said tab having a fastener hole extending therethrough, said fastener hole being centrally positioned between said prominences, said bottom jaw having a primary end and a secondary end, said bottom jaw being elongated between said primary end and said secondary end, said bottom jaw having a top surface and a bottom surface, said top jaw being oriented such that said lower surface faces said top surface of said bottom jaw having said top jaw being coextensive with said bottom jaw;
a block being coupled between said top jaw and said bottom jaw such that said top jaw is spaced from said bottom jaw, said block being positioned on said first portion of said top jaw, said block being positioned closer to said primary end than said secondary end;
a biasing member extending between said top jaw and said bottom jaw, said biasing member being positioned on said second portion of said top jaw, said biasing member biasing said second end of said top jaw away from said secondary end of said bottom jaw, said clipper being positioned in a cutting position having said second end being urged toward said secondary end;
said saddle having an outer wall, said outer wall being curved such that said saddle is substantially cylindrically shaped, said outer wall having a front end and a back end, said saddle being positioned on said upper surface of said bottom jaw, said saddle being oriented to be substantially coextensive with said bottom jaw, said front end having a lip extending forwardly from said outer wall, said lip abutting said bottom jaw, said lip having a distal end with respect to said front end, said lip having an aperture extending through to said bottom jaw, said distal end being aligned with said secondary end of said bottom jaw, said lip being configured to have a head of the shell fish positioned therein;
each of said blades having a forward surface, a rearward surface and a cutting edge extending between said forward surface and said rearward surface, said cutting edge corresponding to each of said blades having a first side and a second side, said second side being arcuate with respect to said first side such that each of said blades forms a parabolic segment, each of said blades having a pair of mounting holes extending through said forward surface and said rearward surface, each of said prominences extending through an associated one of said mounting holes when said selected blade is positioned on said tab such that said selected blade is inhibited from rocking on said tab, said pair of blades including a first blade and a second blade, said second side corresponding to said first blade tapering to a point at a middle of said second side wherein said first blade is configured to pierce a shell of a hard-shelled species of the shellfish thereby inhibiting a bladder of the hard-shelled species of the shellfish from being torn when the shellfish is beheaded, said point on said first blade extending into said aperture in said saddle when said top jaw is urged toward said bottom jaw, said second side corresponding to said second blade being configured to behead a soft-shelled species of the shellfish;

a screw being configured to be manipulated, said screw extending through said selected blade when said selected blade is positioned on said tab and engaging said fastener hole thereby removably retaining said selected blade on said tab;

a first cushion being coupled to said top jaw wherein said first cushion is configured to enhance gripping said top jaw, said first cushion being positioned on said upper surface corresponding to said second portion of said top jaw; and a second cushion being coupled to said bottom jaw wherein said second cushion is configured to enhance gripping said bottom jaw, said second cushion being positioned on said bottom surface of said bottom jaw, said second cushion being substantially coextensive with said bottom jaw, said second cushion having a lowermost surface, said lowermost surface undulating between said primary end and said secondary end of said bottom jaw wherein said second cushion is configured to accommodate fingers when said second cushion is gripped.

12. A shellfish beheading assembly comprising:

a clipper comprising a top jaw and a bottom jaw, said top jaw being hingedly coupled to said bottom jaw, said clipper being configured to have a shellfish positioned between said top jaw and said bottom jaw, said top jaw being selectively urged toward said bottom jaw;

a saddle being coupled to said clipper wherein said saddle is configured to have the shellfish positioned therein;

a pair of blades, a selected one of said blades being removably coupled to said clipper wherein said selected blade is configured to behead the shellfish when said top jaw is urged toward said bottom jaw;

wherein each of said blades has a forward surface, a rearward surface and a cutting edge extending between said forward surface and said rearward surface, said cutting edge corresponding to each of said blades having a first side and a second side, said second side being arcuate with respect to said first side such that each of said blades forms a parabolic segment;

said top jaw includes a tab, said tab having a pair of prominences; and each of said blades having a pair of mounting holes extending through said forward surface and said rearward surface, each of said prominences extending through an associated one of said mounting holes when said selected blade is positioned on said tab such that said selected blade is inhibited from rocking on said tab.

13. The assembly according to claim 12, further comprising a screw being configured to be manipulated, said screw extending through said selected blade when said selected blade is positioned on said tab and engaging said fastener hole thereby removably retaining said selected blade on said tab.

* * * * *